US011860188B2

(12) United States Patent
Shim et al.

(10) Patent No.: US 11,860,188 B2
(45) Date of Patent: Jan. 2, 2024

(54) PROBE FOR SCANNING PROBE MICROSCOPE AND BINARY STATE SCANNING PROBE MICROSCOPE INCLUDING THE SAME

(71) Applicant: Industry-Academic Cooperation Foundation, Yonsei University, Seoul (KR)

(72) Inventors: Wooyoung Shim, Seoul (KR); Gwangmook Kim, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 17/703,791

(22) Filed: Mar. 24, 2022

(65) Prior Publication Data
US 2022/0308086 A1 Sep. 29, 2022

(30) Foreign Application Priority Data
Mar. 25, 2021 (KR) .................. 10-2021-0038446

(51) Int. Cl.
*G01Q 70/06* (2010.01)
*G01Q 60/40* (2010.01)
*G01Q 10/06* (2010.01)

(52) U.S. Cl.
CPC .......... *G01Q 60/40* (2013.01); *G01Q 10/065* (2013.01); *G01Q 70/06* (2013.01)

(58) Field of Classification Search
CPC ........ G01Q 60/10; G01Q 60/14; G01Q 60/16; G01Q 60/40; G01Q 70/06
See application file for complete search history.

(56) References Cited

U.S. PATENT DOCUMENTS

| 7,022,976 | B1 | 4/2006 | Santana, Jr. et al. |
| 7,553,335 | B2 | 6/2009 | Tanda et al. |
| 9,274,138 | B2 | 3/2016 | Sadeghian Marnani et al. |
| 2005/0127929 | A1 | 6/2005 | Petersen et al. |
| 2012/0167262 | A1 | 6/2012 | Mirkin et al. |
| 2014/0141167 | A1 | 5/2014 | Braunschweig et al. |
| 2015/0309073 | A1 | 10/2015 | Mirkin et al. |
| 2018/0149673 | A1* | 5/2018 | Huo ........... G01Q 70/14 |
| 2018/0217183 | A1 | 8/2018 | Ivankin et al. |

FOREIGN PATENT DOCUMENTS

| JP | 2002174580 A | 6/2002 |
| JP | 2005514625 A | 5/2005 |
| KR | 1020070012803 A | 1/2007 |
| KR | 1020120026598 A | 3/2012 |
| KR | 102112995 B1 | 5/2020 |

OTHER PUBLICATIONS

Vettiger et al., "Ultrahigh density, high-data-rate NEMS-based AFM data storage system," 1999, Microelectronic Engineering, vol. 46, pp. 11-17.

* cited by examiner

*Primary Examiner* — Eliza W Osenbaugh-Stewart
(74) *Attorney, Agent, or Firm* — The Webb Law Firm (57) ABSTRACT

Provided is a scanning probe microscope, and in particular, a scanning probe microscope capable of scanning a large area using a probe including a plurality of conductive tips and capable of simply generating a surface image of a sample with high resolution by recognizing only two binary states of contact/non-contact between the conductive tips and a surface of the sample.

17 Claims, 10 Drawing Sheets

FIG. 1

PRIOR ART

FIG. 2

PRIOR ART

PROBE FOR SCANNING PROBE MICROSCOPE AND BINARY STATE SCANNING PROBE MICROSCOPE INCLUDING THE SAME

CROSS-REFERENCE TO RELATED APPLICATION

This application claims priority to Korean Patent Application No. 10-2021-0038446, filed on Mar. 25, 2021, the disclosure of which is hereby incorporated by reference in its entirety.

BACKGROUND OF THE INVENTION FIELD OF THE INVENTION

The following disclosure relates to a scanning probe microscope, and in particular, to a scanning probe microscope capable of scanning a large area using a probe including a plurality of conductive tips and capable of simply generating a surface image of a sample with high resolution by recognizing only two binary states of contact/non-contact between the conductive tips and a surface of the sample.

DESCRIPTION OF RELATED ART

A scanning probe microscope (SPM) refers to a microscope that shows a 3D image by measuring surface characteristics of a sample, while scanning a surface of the sample with a fine probe manufactured through an MEMS process. These scanning probe microscopes are classified into atomic force microscopes (AFMs), scanning tunneling microscopes (STMs), and the like according to measurement methods.

Figure 1:
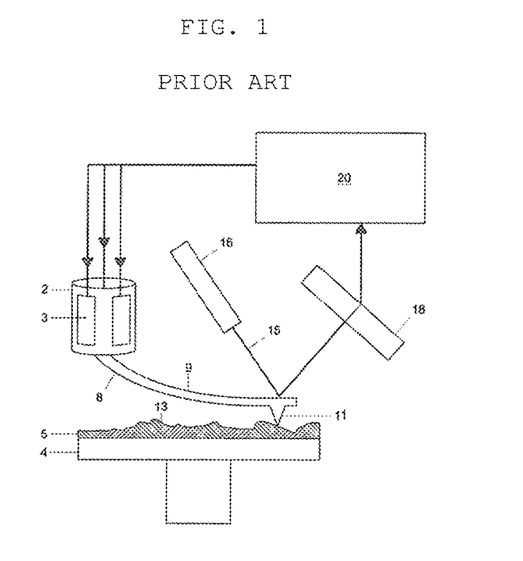
FIG. 1 shows an atomic force microscope among conventional scanning probe microscopes.

FIG. 1 shows an atomic force microscope, among conventional scanning probe microscopes. The conventional scanning probe microscope measures a surface shape of a sample by bringing a probe attached to a tip of a cantilever close to or into contact with a sample surface and measuring bending of the cantilever by a physical quantity interacting between the sample and the probe.

Specifically, a probe head 2 includes a piezoelectric driver 3 for driving a probe 8 in X, Y, and Z directions. The probe 8 includes a cantilever 9 having a probe tip 11 disposed to scan a sample surface 5. During scanning, a vibration piezoelectric (not shown) may actuate the cantilever in various manners, for example, in proximity to a resonant frequency, and tap a surface of the probe tip. Methods for applying vibration motion to the probe tip are known to those skilled in the art.

Scanning of the sample surface 5 is performed by driving the probe tip 11 in X and Y directions parallel to the sample surface 5 (or by driving a substrate surface, while maintaining a position of the probe tip fixed in the X and Y directions). The probe tip 11 is brought into proximity to the surface 5 by a Z-directional piezoelectric driver. When the probe tip 11 is in such a proximal position, the probe tip 11 vibrates to repeatedly contact the surface 5 during scanning. At the same time, a laser 16 irradiates a laser beam 15 to the probe tip. An exact position in the Z direction is determined using a photodiode 18 that receives the reflected laser beam 15.

The sample surface 5 is driven using a sample carrier 4. The driving of a piezoelectric driver 3 located on a probe head is performed using a detector and feedback electronic device 20. At the same time, the detector and feedback electronic device 20 receive a detected Z position determined using a photodiode 18. This principle enables a very accurate mapping of the surface element, for example, the surface element 13, on the sample surface.

This single-tip SPM is an important tool for examining structural and electronic properties of thin film materials and devices. For example, single-tip SPM may form images of one or more surfaces of thin film materials or devices with very high resolution and precision using a physical probe that scans objects. However, as is well known, there is a problem in that throughput is significantly reduced due to very high resolution and precision.

Figure 2:
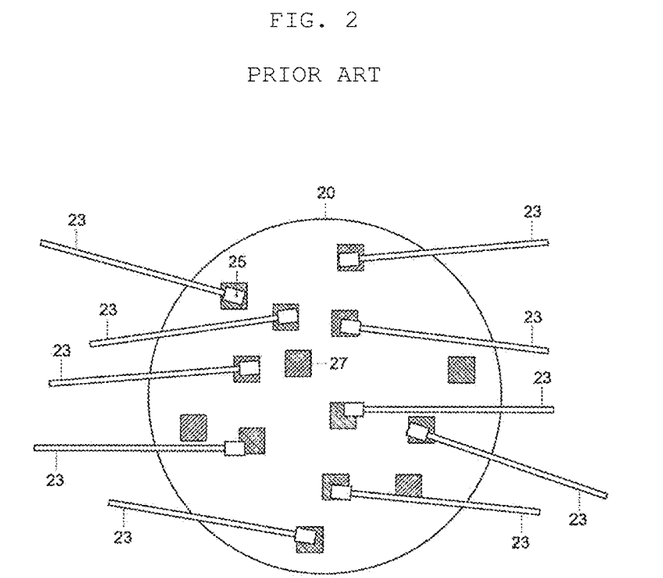
FIG. 2 shows a conventional scanning probe microscope (SPM) equipped with a plurality of probes.

In order to solve the problem of throughput, recently, an SPM including a probe head in which a plurality of probes are mounted in parallel has been proposed. FIG. 2 shows an SPM equipped with a plurality of probes, each probe includes a cantilever and a probe tip, and a position in the z-direction may be independently measured by the probe tip. Thereby, throughput may be increased as much as a value obtained by multiplying a scanning rate of a zone by the number of probe tips present on a head.

However, in this SPM, like the single-tip SPM of the related art, a cantilever is required for each probe and an optical system such as a laser beam and a photodiode sensor should be separately installed in each probe, so the configuration is complicated, an operation is difficult, and a reduction in size is limited. In addition, manufacturing costs are so high that there is a limit in implementing the SPM in economic and technical aspects.

RELATED ART DOCUMENT

Patent Document (Patent document 1) Korean Patent Publication No. 2112995 (published on May 14, 2020)

SUMMARY OF THE INVENTION

An exemplary embodiment of the present invention is directed to providing a scanning probe microscope capable of scanning a large area using a probe including a plurality of conductive tips and capable of simply generating a surface image of a sample with high resolution by recognizing only two binary states of contact/non-contact between the conductive tips and a surface of the sample.

In one general aspect, a probe includes: a substrate; a plurality of electrodes formed on the substrate; and a tip array provided on the substrate and including a plurality of conductive tips electrically connected to the plurality of electrodes, respectively, wherein the conductive tips are compressible and relaxed.

The conductive tip may have an elastic portion formed therein, and a metal layer may be formed on a surface of the elastic portion.

The elastic portion may be formed of an elastomer material.

The tip array may further include a bottom portion, and the conductive tips may each be disposed on the bottom portion.

The bottom portion and the elastic portion of the conductive tip may be integrally formed.

Each of the plurality of electrodes may include a bottom portion surface metal layer formed by coating a surface of the bottom portion with a metal.

The bottom portion surface metal layer and the metal layer of the conductive tip connected to each electrode may be integrally formed.

The elastic portion may be formed of a polydimethylsiloxane (PDMS) material, and the degree of irreversible deformation of the conductive tip may be adjusted according to a crosslinking ratio of PDMS, which is a material of the elastic portion, and a thickness of the metal layer.

The elastic portion may be prepared from a curing reaction of a curable PDMS resin and a curing agent in a weight ratio of 5:1 to 20:1.

The thickness of the metal layer may be 50 nm or less and 1 nm or greater.

A height of the conductive tip after the conductive tip may be compressed and relaxed one or more times may be 90% or more of an initial height of the conductive tip.

In the tip array, the plurality of conductive tips may be arranged in an n×m array (any one of n and m is 2 or greater and the other is a natural number greater than or equal to 1).

The probe may not include a cantilever.

In another general aspect, a binary state scanning probe microscope includes: the probe scanning a surface of a sample; a driving unit including a piezo actuator moving the probe with respect to the sample; a voltage applying unit applying a voltage to the sample; a data unit converting an electrical signal applied to each electrode into a data signal; and an imaging unit receiving the data signal from the data unit and generating an image of the sample surface based on the data signal.

The electrical signal may be a voltage signal applied to each electrode.

A voltage may be applied to each electrode when the conductive tip connected to each electrode contacts the sample surface, and may not be applied when the conductive tip connected to each electrode does not contact the sample surface.

The data unit may generate a binary contact data signal of 1 when a voltage is applied to each of the electrodes and 0 when a voltage is not applied to each of the electrodes.

The imaging unit may be provided with information on an initial point at which a voltage starts to be applied to each electrode and information on a time interval from the initial point to an end point at which the voltage is short-circuited for the electrode, and generate an image on the sample surface based on the information on the initial point and the information on the time interval.

Other features and aspects will be apparent from the following detailed description, the drawings, and the claims.

DESCRIPTION OF THE INVENTION

Hereinafter, exemplary embodiments will be described in detail with reference to the accompanying drawings.

Figure 3:
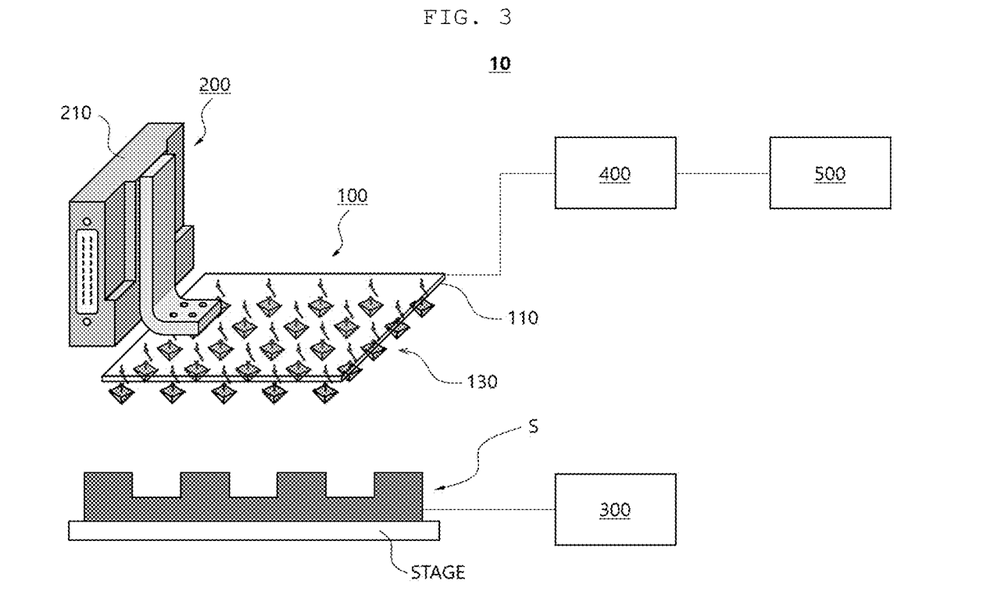
FIG. 3 is a diagram schematically illustrating a binary state SPM according to an exemplary embodiment of the present invention.
Figure 4:
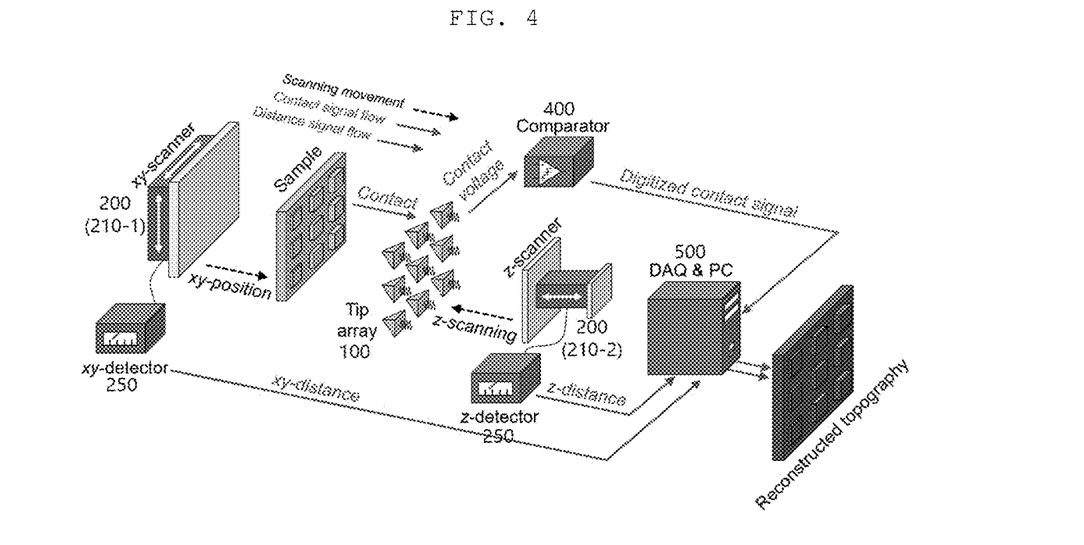
FIG. 4 is a schematic diagram showing FIG. 3 in more detail.

FIG. 3 is a diagram schematically showing a binary state scanning probe microscope according to an example of the present invention, and FIG. 4 is a schematic diagram showing FIG. 3 in more detail. As shown, a scanning probe microscope (SPM) of the present invention includes a probe 100, a driving unit 200, a voltage applying unit 300, a data unit 400, and an imaging unit 500.

The probe 100 scans a surface of a sample S, the driving unit 200 includes a piezo actuator 210 moving the probe 100 with respect to the sample S, the voltage applying unit 300 applies a voltage to the sample S, the data unit 400 converts an electrical signal applied to each electrode 120 into a data signal, and the imaging unit 500 generates a surface image of the sample S.

Figure 5:
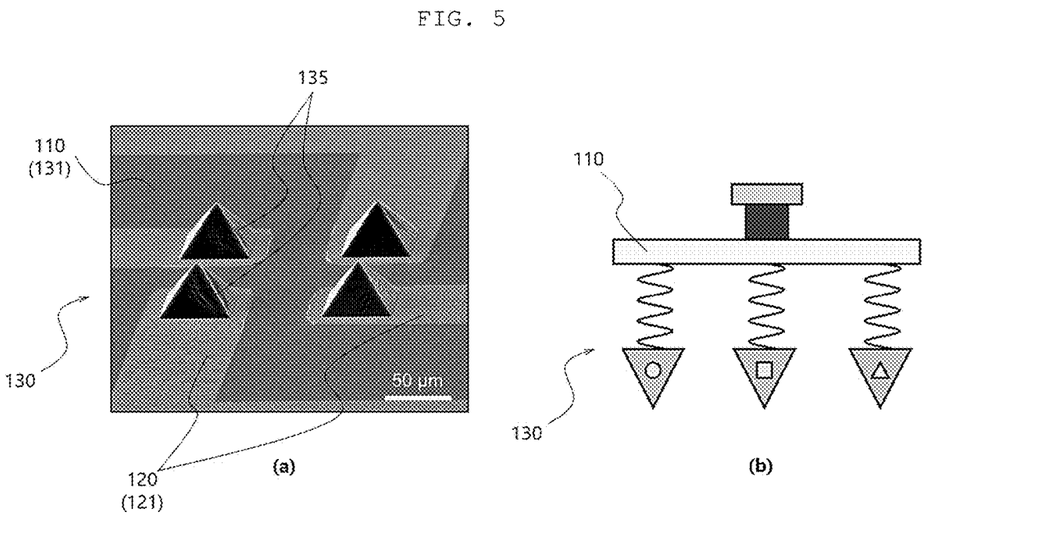
FIG. 5 shows a probe according to an exemplary embodiment of the present invention.
Figure 6:
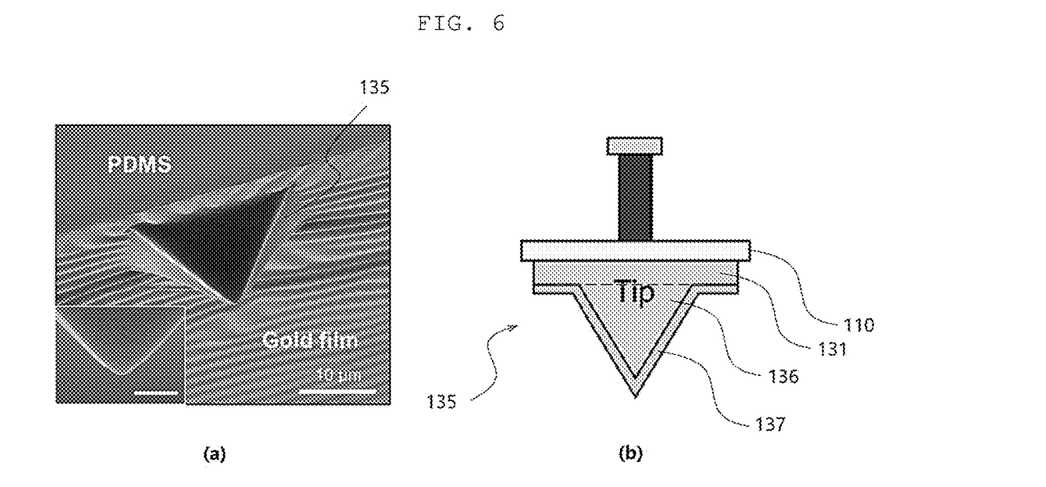
FIG. 6 shows one conductive tip in a probe.

First, the probe 100 according to the present invention will be described in detail. FIG. 5 shows a probe according to an example of the present invention, and FIG. 6 shows a conductive tip in a probe. As shown, the probe 100 of the present invention includes a substrate 110, a plurality of electrodes 120 and a tip array 130.

The substrate 110 provides a space in which the conductive tips 130 are seated, and may be, for example, a glass substrate.

The plurality of electrodes 120 may be formed on the substrate, and specifically, may be formed by coating a metal, which is a conductive material, on the substrate 110.

The tip array 130 is provided on the substrate 110 and includes a plurality of conductive tips 135 respectively connected to the plurality of electrodes 120, and in this case, the conductive tips 135 may form an array. An array refers to a form in which the conductive tips 135 are arranged in a predetermined pattern. For example, the conductive tips 135 may have a quadrangular shape and are arranged in an n×m (n and m are natural numbers of 1 or 2 or greater) array.

The conductive tips 135 may be arranged in a 2×2 form as shown in FIG. 5(a). However, the present invention is not limited thereto, and the conductive tips 135 may be arranged in a circular shape having concentric circles as a whole. At this time, the respective conductive tips 135 may have the same size and shape as each other, but even if the size and shape (e.g., a position of a tip portion of each of the conductive tips) have a predetermined deviation, information obtained therefrom may be synchronized with each other by software to be corrected, so that an interval between the conductive tips 135 or an interval patterns formed by arranging the conductive tips 135 may not be physically equal to each other.

Here, each conductive tip 135 of the present invention may be compressible and relaxed. That is, the probe of the present invention scans the surface of the sample, and as described below, when the probe descends, the conductive tip touches the surface of the sample, and in this state, when the probe continues to descend, the probe may be pressed by the surface of the sample and the conductive tip may be compressed. Thereafter, when the probe changes directions and ascends, the conductive tip may relax to an initial shape thereof.

As shown in FIG. 6, each conductive tip 135 of the present invention may include an elastic portion 136 formed therein and a metal layer 137 formed on a surface of the elastic portion 136.

The elastic portion 136 may be formed of a material having elasticity, for example, an elastomer material, and specifically, may be an elastomer manufactured by curing or crosslinking a curable polymer resin. A specific example of the elastomer may be a cured polydimethylsioxane (PDMS) material. Also, the elastic portion 136 may have a pyramid shape.

The conductive tip 135 of the present invention may be formed of the metal layer 137 formed by coating a surface of the elastic portion 136 formed of an elastic material and having a pyramid shape with a metal, and here, the metal layer 137 may include at least one of Au, Ag, Cr, Mo, Al, Ti, Cu, Ni, Pt, Pd, Rh, and W and may be formed of a single layer or a multi-layer.

Figure 7:
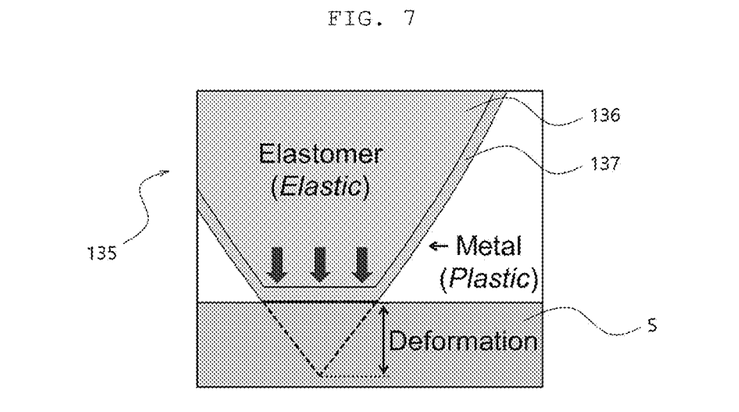
FIG. 7 is a view schematically showing that a conductive tip of the present invention is compressed and deformed.

FIG. 7 is a view schematically showing that a conductive tip of the present invention is compressed and deformed. As such, in the conductive tip 135 of the present invention, the elastic portion 136 formed therein is formed of an elastic material, so that the conductive tip 135 may be compressed in contact with the sample S to be deformed, and thereafter, the conductive tip 135 may be separated from the sample S and relaxed to be returned to its initial shape. Also, since the metal layer 137 is formed on the surface of the elastic portion 136, the surface of the sample S may be scanned using an electrical signal as described below.

Figure 8:
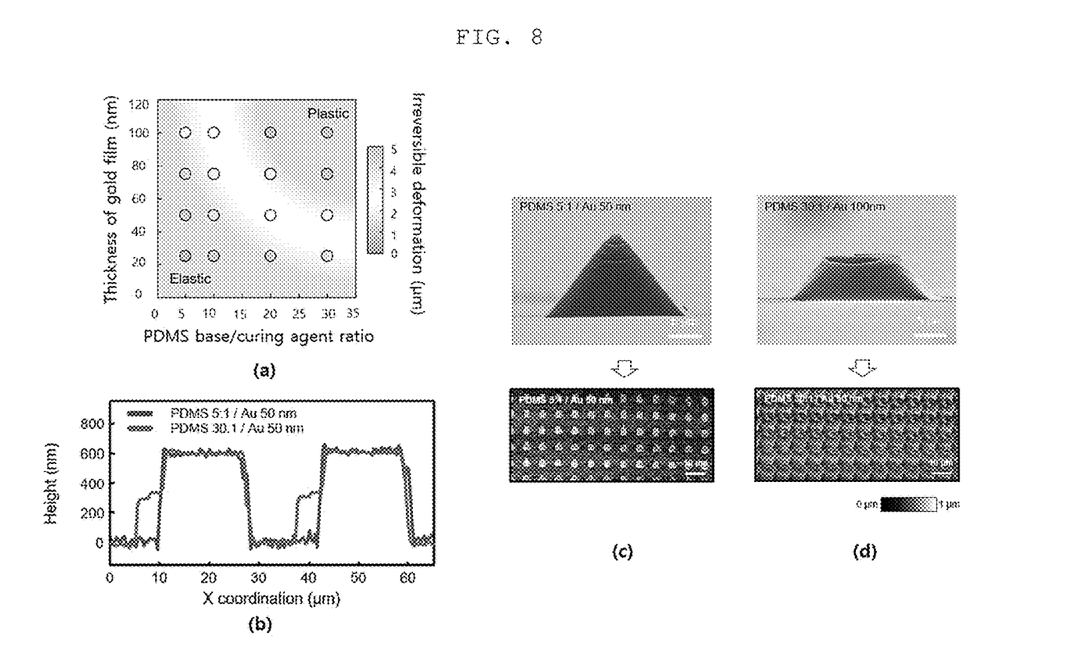
FIG. 8 shows the degree of irreversible deformation according to properties of a tip and a metal in a conductive tip of the present invention.

FIG. 8 is a graph showing the degree of irreversible deformation according to the properties of the elastic portion and the metal layer in the conductive tip of the present invention. FIG. 8(a) shows the degree of irreversible deformation according to a crosslinking ratio of PDMS and a thickness of the metal layer 137, FIG. 8(b) is a graph showing comparison between crosslinking ratios of PDMS as 5:1 and 30:1, FIG. 8(c) is an image of a sample S generated using a probe in which a crosslinking ratio of PDMS is 5:1, and FIG. 8(d) is an image of a sample S generated using a probe in which a crosslinking ratio of PDMS is 30:1.

The crosslinking ratio of PDMS is a weight ratio of a curable PDMS resin (PDMS base)/curing agent, and the crosslinking ratio of PDMS may be adjusted according to a weight ratio of the curable PDMS resin and the curing agent. For example, as the content of the curing agent increases as compared to the curable PDMS resin, the crosslinking ratio may increase to manufacture a hard elastic portion, and as the content of the curing agent decreases, a soft elastic portion may be manufactured. Accordingly, the crosslinking ratio of PDMS, X:1, which will be described below, refers to the weight ratio of the curable PDMS resin and the curing agent, unless otherwise defined, which means that a soft elastic portion is manufactured as X increases.

As shown in FIG. 8, as the crosslinking ratio of PDMS and the thickness of the metal layer 137 (that is, a coating thickness of the metal) decrease, elasticity of the conductive tip 135 increases, thereby reducing the degree of irreversible deformation, and as the crosslinking ratio of PDMS and the thickness of the metal layer 137 increase, plasticity of the conductive tip 135 increases, thereby increasing the degree of irreversible deformation. As shown in FIGS. 8(c) and 8(d), it can be seen that resolution of the sample image is high when the crosslinking ratio of PDMS is 5:1, whereas the resolution of the sample image is low when the crosslinking ratio of PDMS is 30:1.

Figure 9:
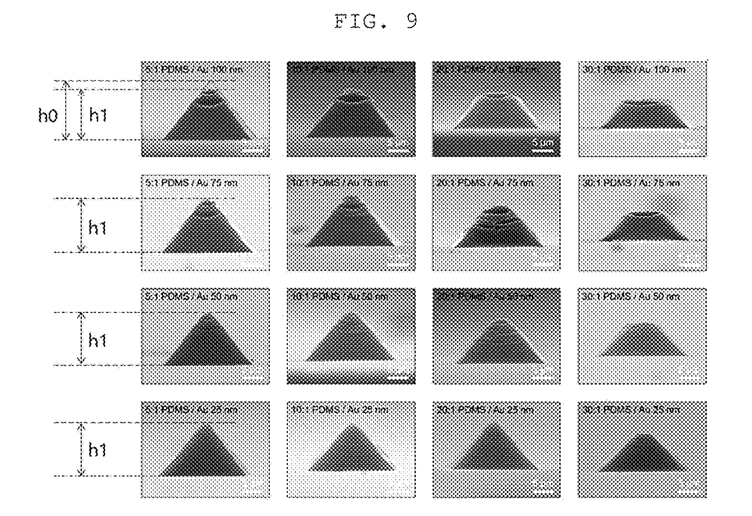
FIG. 9 is an SEM image after compression relaxation of a conductive tip according to various examples of the present invention.

FIG. 9 is an SEM image after compression relaxation of a conductive tip according to various examples of the present invention. As shown, the shape of the conductive tip 135 after compression relaxation may be appropriately restored by appropriately adjusting the crosslinking ratio of PDMS and the thickness of the metal layer 137. For example, after the conductive tip 135 is compressed and relaxed one or more times, a height h1 of the conductive tip may be 90% or more, specifically 95% or more, compared to an initial height h0 of the conductive tip. For a more preferred example, after the conductive tip 135 is compressed and relaxed 100 times or more, the height h1 of the conductive tip may be 90% or more of the initial height h0 of the conductive tip. In this manner, resolution of the sample image may be adjusted by appropriately adjusting a recovery rate of the conductive tip. Here, the initial height corresponds to a height of the conductive tip in an initial state in which the conductive tip is not compressed and relaxed.

If the elasticity of the conductive tip 135 is too large, the conductive tip 135 may not be restored to its original state after being compressed. If the plasticity of the conductive tip 135 is too large, the conductive tip 135 itself may be damaged when the conductive tip 135 is compressed, so the conductive tip 135 cannot be returned to its original state, and thus, the tip portion of the conductive tip 135 may become dull and the resolution of the sample image may be lowered. Therefore, it is preferable for the conductive tip 135 to have an appropriate degree of irreversible deformation by appropriately adjusting the thickness of the crosslinking ratio of PDMS and the thickness of the metal layer 137. Here, if the ratio of the curing agent to a main material of PDMS (curable PDMS resin) exceeds 20:1, the recovery rate of the conductive tip may decrease, as shown, and thus, the ratio of the main material of PDMS to the curing agent may be between 5:1 and 20:1. That is, the elastic portion 136 of the conductive tip 135 may be manufactured from a curing reaction of the curable PDMS resin and the curing agent in a weight ratio of 5:1 to 20:1, preferably 7:1 to 18:1, more preferably 10:1 to 15:1. In addition, if the thickness of the metal layer exceeds 50 nm, the recovery rate of the conductive tip may be similarly reduced, so the thickness of the metal layer may be 50 nm or less, preferably 40 nm or less, more preferably 30 nm or less, and may be 1 nm or more, preferably 5 nm. At this time, the numerical range according to the combination of each numerical upper limit and lower limit should also be interpreted as being included in the thickness of the metal layer according to the present invention. However, the present invention is not limited thereto, and in an actual experiment, a metal layer having a thickness of 100 nm may be used depending on the purpose thereof, and of course, the thickness of the metal layer may be designed to be 50 nm or more in consideration of the elasticity of the elastic portion.

Figure 10:
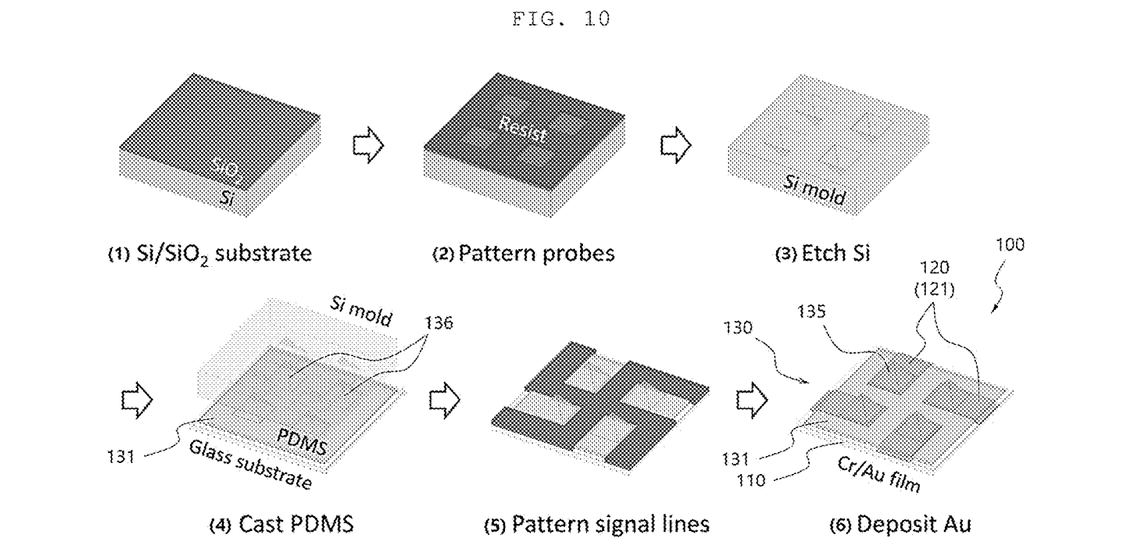
FIG. 10 is a diagram illustrating a method of manufacturing a probe according to an exemplary embodiment of the present invention.

FIG. 10 is a view showing a method of manufacturing a probe according to an exemplary embodiment of the present invention. The probe 100 of the present invention may be formed by etching a pattern of a tip using a mask (registry) on a silicon substrate to generate a silicon mold etched in a pyramid shape, stacking elastic elastomer (as a specific example, PDMS) on a glass substrate 110, generating a PDMS casting including a bottom portion 131 and a plurality of elastic portions 136 disposed on the bottom portion using the silicon mold generated before, appropriately patterning a resist on the PDMS casting in consideration of an electrode line to be connected to the conductive tip, and depositing and coating a metal on the PDMS casting on which the resist is patterned.

The deposition-coating of the metal may be performed by known deposition processes such as chemical vapor deposition, atomic layer deposition, and physical vapor deposition, but is not limited thereto.

As described above, according to the present invention, there is an advantage in that a plurality of conductive tips 135 may be manufactured at once in a simple process, and in this case, since the metal is deposited on the tip casting on which the resist is patterned, the plurality of electrodes 120 may be simultaneously formed on the substrate 110 at the same time when the metal layer 137 is applied to the surface of the elastic portion 136. Thus, since the plurality of electrodes 120 may be formed by the same process as the process of forming the metal layer 137 on the surface of the elastic portion 136, the probe 100 may be simply manufactured.

In the probe 100 manufactured as described above, the tip array 130 may further include the bottom portion 131, and the conductive tips 135 may each be disposed on the bottom portion 131. Here, the bottom portion 131 and the elastic portion 136 of the conductive tip may be integrally formed as shown in (4) of FIG. 10, and each of the plurality of electrodes 120 may include a bottom portion surface metal layer 121 formed by applying a metal to the surface of the bottom portion 131. Here, the bottom portion surface metal layer 121, which is formed by deposition-coating a metal on the PDMS casting as described above, may be formed simultaneously when the metal layer 137 of the conductive tip 135 is formed, and accordingly, the bottom portion surface metal layer 121 and the metal layer 137 of the conductive tip 135 connected to each electrode 120 may be integrally formed.

As described above, compared with the probe of the SPM of the related art including a cantilever and an optical system as essential components, the probe of the present invention does not need a separate cantilever and optical system, so that a configuration thereof is very simple, an overall packaging size may be significantly reduced, it is easy to manufacture the probe, and manufacturing costs may be significantly reduced. Furthermore, since the probe includes a plurality of conductive tips, a large area of the sample may be scanned at the same time, so that scanning throughput may be significantly increased, and since the conductive tip may be freely arranged according to the shape of the sample, the types of samples that can be scanned with the probe may be expanded.

Hereinafter, a binary state SPM according to an exemplary embodiment of the present invention including the probe described above will be described in detail.

Referring back to FIGS. 3 and 4, as described above, the SPM 10 of the present invention includes the probe 100, the driving unit 200, the voltage applying unit 300, the data unit 400, and the imaging unit 500, and although not shown separately, may further include a controller for controlling each component, and may further include a position sensor 250 measuring a position of a piezo actuator.

The driving unit 200 moves the probe 100 relative to the sample, and may include a piezo actuator 210 that is a driving element moving the probe 200. The piezo actuator 210 may move in a direction Z perpendicular to the sample S and a direction XY horizontal to the sample S, and the probe 100 may be mounted on the piezo actuator 210 and may be moved in a vertical direction and a horizontal direction with respect to the sample S. Here, as a more specific example, the piezo actuator 210 of the present invention may include an xy piezo actuator 210-1 moving a state on which the sample S is mounted in a horizontal direction and a z piezo actuator 210-2, on which the probe 100 is mounted, moving the probe 100 in a vertical direction, but the configuration of such a piezo actuator may be freely changed, and, hereinafter, the xy piezo actuator 210-1 and the z piezo actuator 210-2 will be collectively referred to as a piezo actuator, without being distinguished from each other.

The voltage applying unit 300 applies a voltage to the sample, and when the sample S is a conductive material, the voltage applying unit 300 may apply a voltage directly to the sample S, and when the sample S is not a conductive material, that is, an insulating material, a surface of the sample S may be coated with a metal, a conductive material, to form a conductive layer on the surface of the sample, and then, a voltage may be applied to the conductive layer on the surface of the sample S. A magnitude of the voltage applied to the sample S by the voltage applying unit 300 may be about 10 to 100 mV, and may be normally applied with a magnitude of 40 mV.

The data unit 400 converts an electrical signal applied to each electrode 120 into a data signal, and may generate a data signal by sampling the electrical signal applied to each electrode 120. Here, the electrical signal may correspond to a current or a voltage signal applied to each electrode, and in particular, a voltage signal may be used in the present invention.

Figure 11:
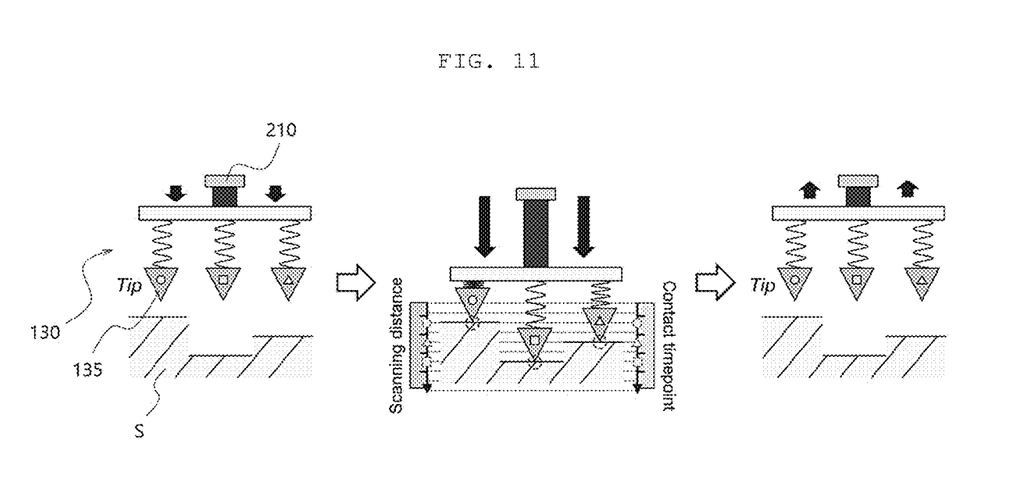
FIGS. 11 and 12 show an operating principle of a microscope according to an exemplary embodiment of the present invention.
Figure 12:
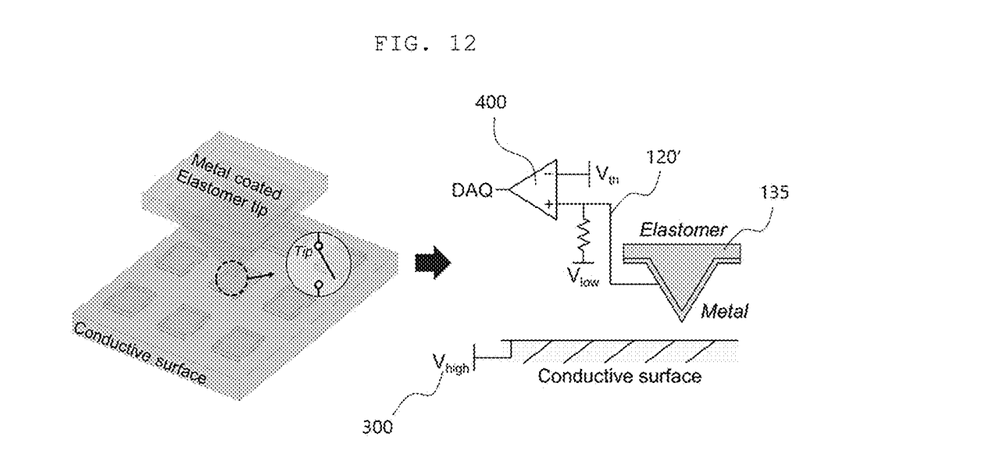

FIGS. 11 and 12 show an operating principle of a microscope according to an example of the present invention. As shown, the probe 100 is moved in a vertical downward direction with respect to the sample S by the piezo actuator 210, and each of the conductive tips 135 of the probe 100 comes into contact with the surface of the sample S. At this time, since a voltage is applied to the sample S by the voltage applying unit 300, the conductive tip 135 and an electrode 120' electrically connected to the corresponding conductive tip form a closed circuit and a voltage is applied to the electrode 120 the moment the conductive tip comes into contact with the surface of the sample S. Thereafter, the piezo actuator 210 moves downward by a set distance and then moves upward again, so that the conductive tip 135 is separated from the surface of the sample S and no voltage is applied thereto. That is, when the conductive tip 135 comes into contact with the surface of the sample S according to the downward movement of the probe 100, a voltage is applied to the electrode 120' connected to the corresponding conductive tip 135, and when the conductive tip 135 is separated from the surface of the sample S according to the upward movement of the probe (i.e., in the case of non-contact), a voltage is short-circuited with respect to the electrode 120' connected to the corresponding conductive tip 135.

Whether a voltage is applied to the electrode 120' generated by whether the conductive tip 135 and the surface of the sample S are in contact with each other may be transmitted to the data unit 400 and converted into a data signal of 1 or 0 by the data unit 400. That is, when a voltage is applied to each electrode 120 (i.e., when each conductive tip and the sample surface are in contact with each other), the data unit 400 may generate a binary contact data signal of 1, and when no voltage is applied to each electrode 120 (i.e., when each conductive tip and the sample surface are not in contact with each other), the data unit 400 may generate a binary contact data signal of 0, and the data unit 400 may transmit the generated binary contact data signal to the imaging unit 500.

Figure 13:
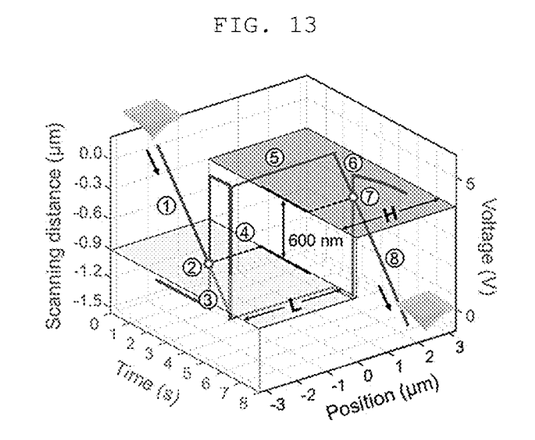
FIG. 13 shows an operating path of a probe according to an exemplary embodiment of the present invention.
Figure 14:
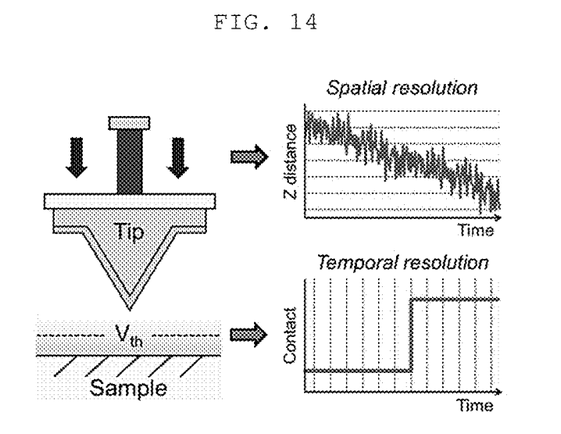
FIGS. 14 and 15 are diagrams illustrating a contact process between a conductive tip and a sample surface.
Figure 15:
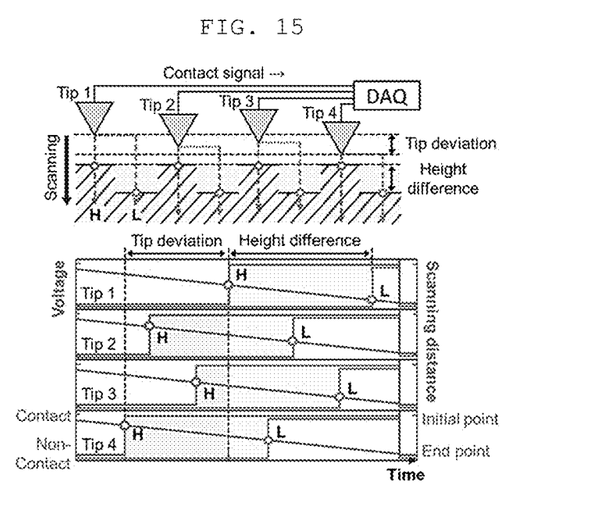

FIG. 13 is a diagram illustrating an operation path of a probe according to an exemplary embodiment of the present invention, illustrating a relationship between a movement path of the probe 100 and a voltage applied to the electrode 120' connected to the conductive tip 135. The sample S may be divided into a lower region L and a higher region H, and the blue line in FIG. 13 indicates a relative movement path of the probe 100 with respect to the sample S, and the red line of FIG. 13 indicates a voltage applied to the electrode 120 connected to the conductive tip 135. As shown, the probe 100, that is, the conductive tip 135, moves downward along a path ①-③ and comes into contact with a surface (−0.9 µm point) of the lower region L of the sample S at a point ② of the downward movement path. In this case, as shown, the conductive tip 135 and the surface of the sample S come into contact at the point ②, so that a voltage is applied to the conductive tip 135 and the electrode 120'. Thereafter, the conductive tip 135 moves upward along the ④ path, the voltage becomes 0 the moment the conductive tip 135 is separated from the surface of the sample S. In this path, a time point at which a voltage is applied to the conductive tip 135 corresponds to a moment of about 2 seconds, and a time point at which the conductive tip 135 is separated from the surface of the sample S corresponds to a moment of about 3 seconds, and thus, it can be seen that a voltage is applied to the conductive tip 135 for a time interval of a total of 1 second. Thereafter, the conductive tip 135 moves in the horizontal direction on the surface of the sample S along a path ⑤ to be located above the higher region H of the sample S, moves downwardly along a path ⑥-⑧, and comes in contact with a surface (−0.3 µm point) of the higher region H of the sample S at point ⑦ of the downward movement path. At this time, as shown, at point ⑦, the conductive tip 135 comes into contact with the surface of the sample S, so that a voltage is applied to the conductive tip 135 and the electrode 120', and it can be seen that a corresponding time point corresponds to about 4 seconds. FIGS. 14 and 15 are views showing a contact process between the conductive tip and the sample surface. As shown, it can be seen that a voltage is applied to the conductive tip 135 and the electrode 120' when the conductive tip 135 comes into contact with the sample S surface and a voltage is not applied when the conductive tip 135 is separated from the sample surface.

In this manner, information on the voltage applied to each electrode 120 may be sampled by the data unit 400, a binary contact data signal converted into 1 and 0 may be transmitted to the imaging unit 500, and the imaging unit 500 may generate a surface image of the sample S using the received sampling data including 1 and 0, that is, a binary contact data signal.

Here, the imaging unit 500 may be provided with information on a time point at which voltage starts to be applied to each electrode 120 from the data unit 400 (a time point of 2 seconds according to the example described above) and information on a time interval from the time point to an end point at which a voltage is not applied to each electrode 120 (a time interval of 1 second with the end point of 3 seconds according to the example described above), and the imaging unit 500 may generate a surface image of the sample S based on the information.

More specifically, the imaging unit 500 may generate a surface image of the sample with reference to a vertical position (displacement) of the piezo actuator obtained through the piezo actuator position sensor described above. For the example described above, when it is assumed that vertical scanning of two points with a 600 nm step difference in the sample is performed from a point 0.3 µm higher than the higher point H, contact occurs at the higher point H when the vertical position of the piezo actuator is −0.3 µm and contact occurs at the lower point L when the vertical position of the piezo actuator is −0.9 µm, so a step difference of 600 nm may be obtained by comparing displacements of the two points.

Meanwhile, in the present invention, information on a vertical movement speed $v_{z\text{-}piezo}$ of the piezo actuator 210 and information on a sampling rate $f_{rate}$ of the binary contact signal may be used to obtain maximum resolution of sample measurement. Specifically, when having a specific speed (e.g., 100 µm/s) and a specific sampling rate (e.g., 100 kHz), the resolution of the microscope according to the present invention may be estimated as $v_{z\text{-}piezo}/f_{rate}$.

Figure 16:
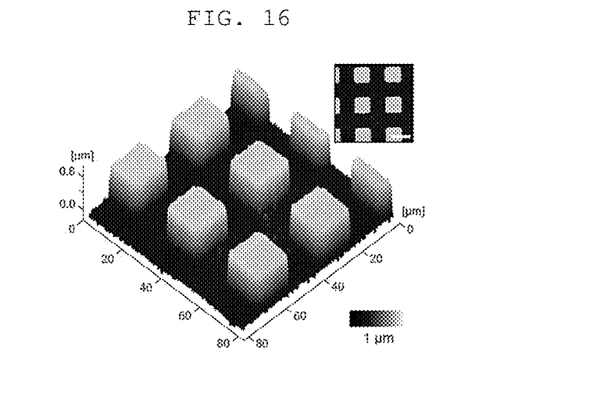
FIG. 16 is a surface image of a sample obtained through a microscope of the present invention.
Figure 17:
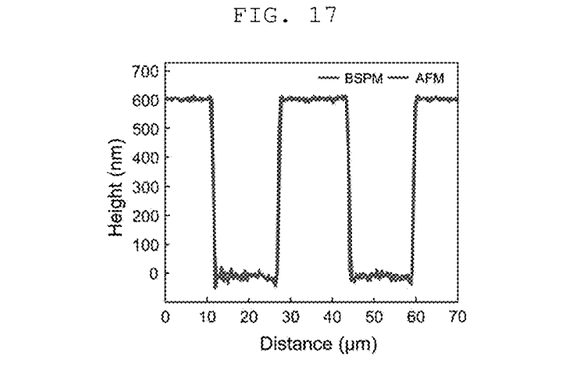
FIG. 17 is a line profile for the sample of FIG. 16.

FIG. 16 is a surface image of a sample obtained through a microscope of the present invention, illustrating a topography image of a sample having a square pattern of 16×16 µm² with a height difference of 600 nm. FIG. 17 is a line profile of the sample of FIG. 16, and it can be seen that a line obtained by a binary-state probe microscopy (BSPM) of the present invention and a line obtained by the conventional single-tip AFM match well.

Figure 18:
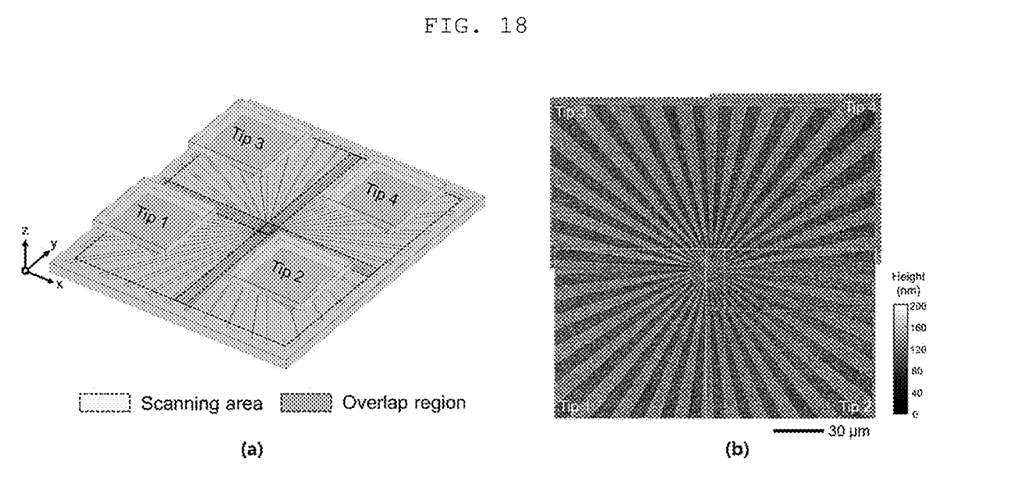
FIG. 18 is a diagram illustrating scanning a surface of a sample using a 2×2 array probe according to an exemplary embodiment of the present invention.

FIG. 18 is a view illustrating scanning a surface of a sample using a 2×2 array probe according to an example of the present invention, in which FIG. 18(a) schematically illustrates overlapped scanning regions of respective conductive tips, and FIG. 18(b) illustrates a composite image of samples obtained from the respective conductive tips. As shown, since the probe includes a plurality of conductive tips, the probe may scan a large region of the sample simultaneously, thereby significantly increasing scanning throughput, and since the overlapped scanning regions between the respective conductive tips are well synchronized, a clear surface image of the sample may be obtained.

Figure 19:
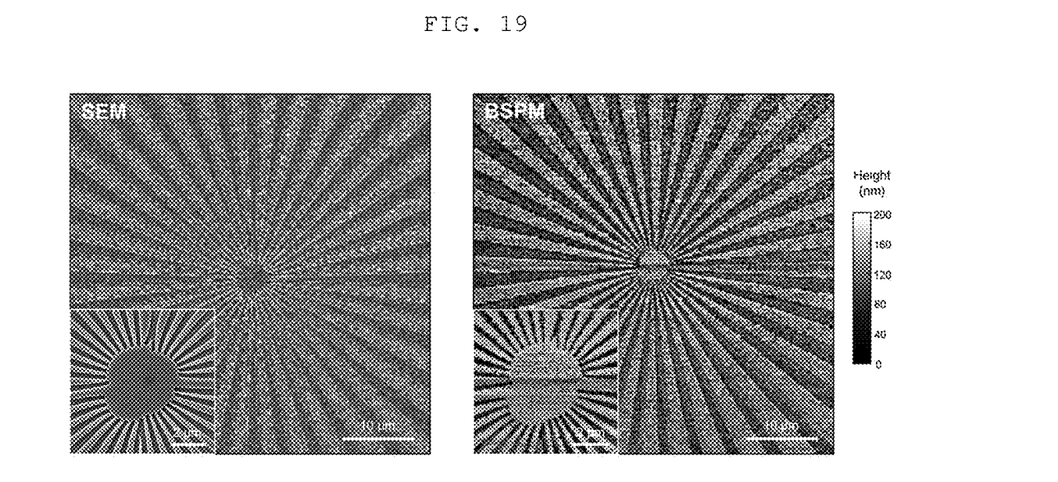
FIG. 19 is a test chart image of each Siemens star having a thickness of 32 nm.

FIG. 19 is a test chart image for each Siemens having a thickness of 32 nm. FIG. 19(a) is an SEM image, and FIG. 19(b) shows an image obtained using the BSPM of the present invention. As shown, it can be seen that the SEM image and the BSPM image match well.

Figure 20:
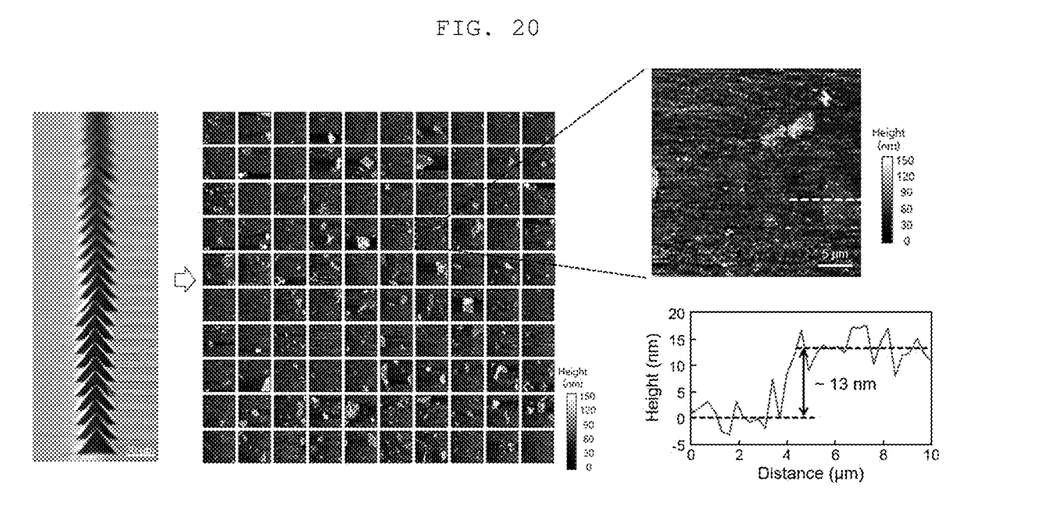
FIG. 20 is a diagram illustrating scanning of a surface of a multilayer graphene sample using a 100×1 array probe according to an example of the present invention.

FIG. 20 is a diagram illustrating scanning of a multilayer graphene sample surface using a 100×1 array probe according to an example of the present invention. As shown, parallel scanning may be performed on each region of a sample using 100 conductive tips. In this case, it can be seen that even a height difference of 13 nm may be distinguished on the surface of the sample.

Figure 21:
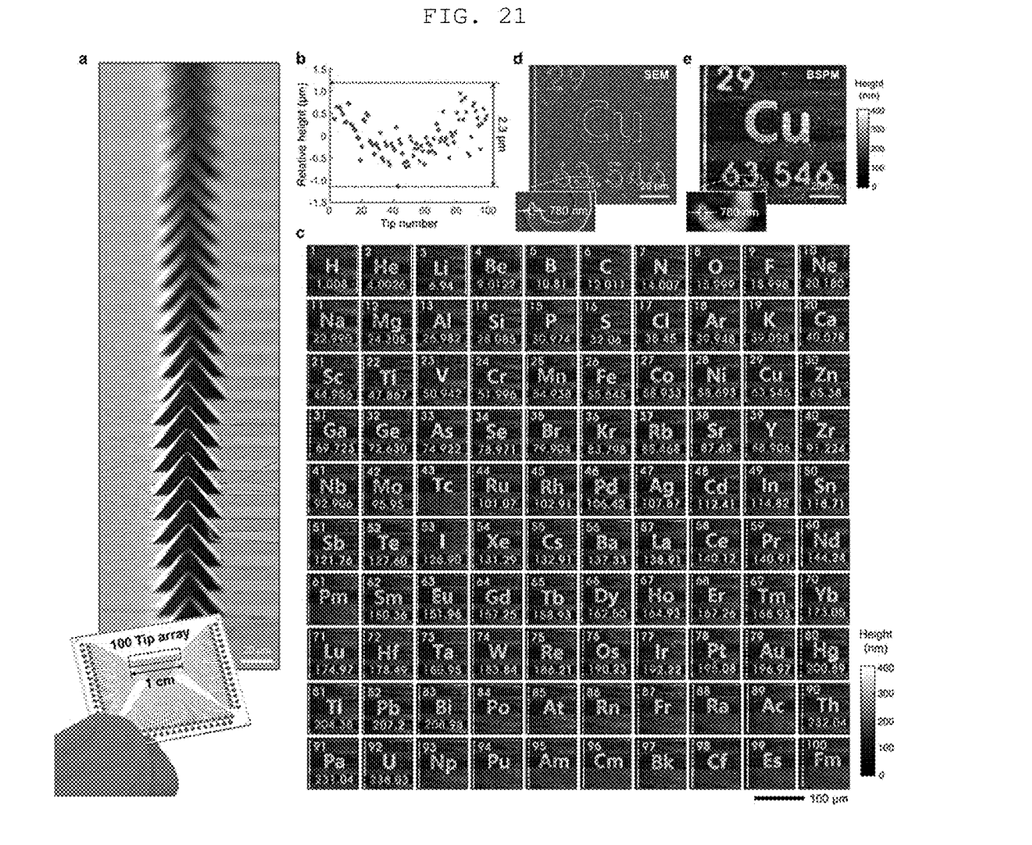
FIG. 21 is a diagram illustrating scanning of a surface of a periodic table pattern sample using a 100×1 array probe according to an exemplary embodiment of the present invention.

FIG. 21 is a diagram illustrating scanning a periodic table pattern sample surface using a 100×1 array probe according to an example of the present invention. As shown, parallel scanning may be performed on each region of a sample using 100 conductive tips, and it can be seen that even a difference in length of 780 nm may be distinguished on the surface of the sample.

As described above, in the SPM of the present invention, as a large-area scanning may be performed on a sample using a probe equipped with a plurality of conductive tips, scanning throughput may be significantly increased, and unlike the multi-probe SPM of the related art that detects a continuous physical interaction of all probes, the present invention may configure a multi-probe structure very simply by recognizing only a contact/non-contact state of a conductive tip and a sample. In addition, according to the present invention, positions of all conductive tips are moved and tracked using a single piezo actuator, thereby minimizing an increase in complexity of a measurement system occurring when the number of conductive tips increases, and since a cantilever and an optical system are eliminated, compared with the existing imaging method requiring micromachining for a cantilever structure in the multi-probe SPM of the related art, the imaging method of the present invention is simpler.

Furthermore, the present invention may be applicable to semiconductor microprocess monitoring and high-speed screening of nanomaterials, which conventional SPM has not been applied to. In particular, 2D materials, which are researched as next-generation electronic materials, have physical properties significantly changed according to the number of atomic layers, so large-area photographic measurement is essential, which can be applied to product manufacturing processes using 2d materials.

As set forth above, compared with the probe of the SPM of the related art including a cantilever and an optical system as essential components, the probe of the present invention does not need a separate cantilever and optical system, so that a configuration thereof is very simple, an overall packaging size may be significantly reduced, it is easy to manufacture the probe, and manufacturing costs may be significantly reduced. Furthermore, since the probe includes a plurality of conductive tips, a large area of the sample may be scanned at the same time, so that scanning throughput may be significantly increased, and since the conductive tip may be freely arranged according to the shape of the sample, the types of samples that can be scanned with the probe may be expanded.

Although the embodiments of the present disclosure have been described above with reference to the accompanying drawings, a person skilled in the art to which the present disclosure pertains will understand that the present disclosure may be implemented in any other specific forms without changing the technical spirit or essential features thereof. Therefore, it should be understood that the embodiments described above are exemplary in all respects and not restrictive.

DETAILED DESCRIPTION OF MAIN ELEMENTS

10: binary state SPM
100: probe
110: substrate
120: a plurality of electrodes
121: bottom portion surface metal layer
120: electrode connected to each conductive tip
130: tip array
131: bottom portion
135: conductive tip
136: elastic portion
137: metal layer
200: driving unit
210: piezo actuator
300: voltage applying unit
400: data unit
500: imaging unit

What is claimed is:

1. A binary state scanning probe microscope comprising:
a probe of scanning a surface of a sample, wherein the probe includes a substrate, a plurality of electrodes formed on the substrate, and a tip array provided on the substrate and including a plurality of conductive tips electrically connected to the plurality of electrodes, respectively, wherein the conductive tips are compressible and relaxed;
a driving unit including a piezo actuator moving the probe with respect to the sample;
a voltage applying unit applying a voltage to the sample;
a data unit converting an electrical signal applied to each electrode into a data signal; and
an imaging unit receiving the data signal from the data unit and generating an image of the sample surface based on the data signal.

2. The binary state scanning probe microscope of claim 1, wherein the electrical signal is a voltage signal applied to each electrode.

3. The binary state scanning probe microscope of claim 2, wherein a voltage is applied to each electrode when the conductive tip connected to each electrode contacts the sample surface, and a voltage is not applied when the conductive tip connected to each electrode does not contact the sample surface.

4. The binary state scanning probe microscope of claim 3, wherein the data unit generates a binary contact data signal of 1 when a voltage is applied to each of the electrodes and 0 when a voltage is not applied to each of the electrodes.

5. The binary state scanning probe microscope of claim 4, wherein the imaging unit is provided with information on an initial point at which a voltage starts to be applied to each electrode and information on a time interval from the initial point to an end point at which the voltage is short-circuited for the electrode, and generates an image on the sample surface based on the information on the initial point and the information on the time interval.

6. The binary state scanning probe microscope of claim 1, wherein the conductive tip has an elastic portion formed therein, and a metal layer is formed on a surface of the elastic portion.

7. The binary state scanning probe microscope of claim 6, wherein the elastic portion is formed of an elastomer material.

8. The binary state scanning probe microscope of claim 6, wherein the tip array further includes a bottom portion, and the conductive tips are each disposed on the bottom portion.

9. The binary state scanning probe microscope of claim 8, wherein the bottom portion and the elastic portion of the conductive tip are integrally formed.

10. The binary state scanning probe microscope of claim 8, wherein each of the plurality of electrodes includes a bottom portion surface metal layer formed by coating a surface of the bottom portion with a metal.

11. The binary state scanning probe microscope of claim 10, wherein the bottom portion surface metal layer and the metal layer of the conductive tip connected to each electrode are integrally formed.

12. The binary state scanning probe microscope of claim 6, wherein the elastic portion is formed of a polydimethylsiloxane (PDMS) material, and the degree of irreversible deformation of the conductive tip is adjusted according to a crosslinking ratio of PDMS, which is a material of the elastic portion, and a thickness of the metal layer.

13. The binary state scanning probe microscope of claim 12, wherein the elastic portion is prepared from a curing reaction of a curable PDMS resin and a curing agent in a weight ratio of 5:1 to 20:1.

14. The binary state scanning probe microscope of claim 12, wherein the thickness of the metal layer is 50 nm or less and 1 nm or greater.

15. The binary state scanning probe microscope of claim 1, wherein a height of the conductive tip after the conductive tip is compressed and relaxed one or more times may be 90% or more of an initial height of the conductive tip.

16. The binary state scanning probe microscope of claim 1, wherein, in the tip array, the plurality of conductive tips are arranged in an n×m array (any one of n and m is 2 or greater and the other is a natural number greater than or equal to 1).

17. The binary state scanning probe microscope of claim 1, wherein the probe does not include a cantilever.

* * * * *